Figure 1:
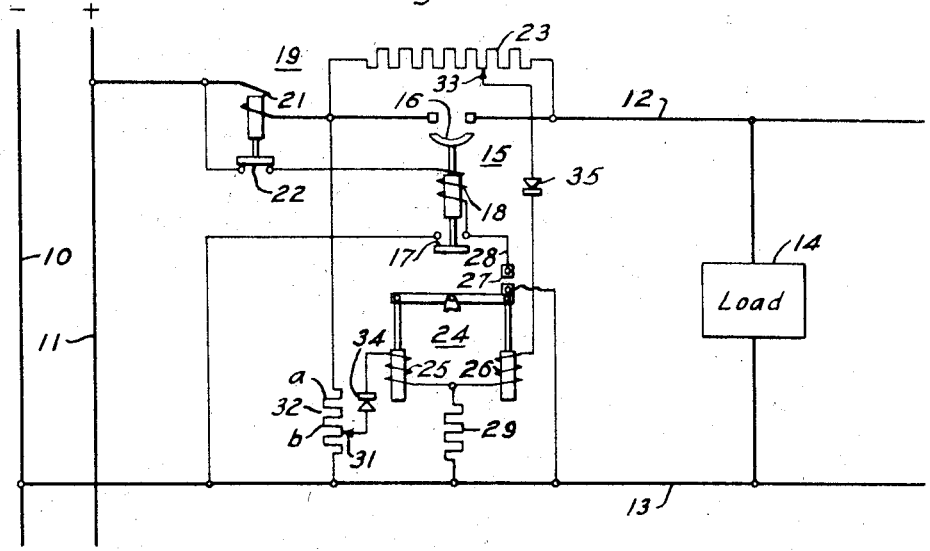

March 28, 1944.                M. E. REAGAN                2,345,155

AUTOMATIC RECLOSING CIRCUIT BREAKER SYSTEM

Filed July 19, 1940

WITNESSES:

INVENTOR
Maurice E. Reagan.
BY
ATTORNEY

Patented Mar. 28, 1944

2,345,155

UNITED STATES PATENT OFFICE 2,345,155

AUTOMATIC RECLOSING CIRCUIT BREAKER SYSTEM

Maurice E. Reagan, Pittsburgh, Pa., assignor to Westinghouse Electric & Manufacturing Company, East Pittsburgh, Pa., a corporation of Pennsylvania Application July 19, 1940, Serial No. 346,269

3 Claims. (Cl. 175—294)

My invention relates, generally, to automatic reclosing circuit breaker systems or devices, and, more particularly, to such systems of the load-measuring type which are commonly referred to as direct-current reclosing systems.

Reclosing systems of this general type have been in use for many years on direct-current distribution systems for protecting stub-end and tie-feeders against damage resulting from short circuits and overloads which may occur from time to time. While the systems now in use are satisfactory in a general way, they do not provide the high degree of accuracy and sensitivity in load resistance measuring that is desirable and necessary in many instances.

Accordingly, it is an object of my invention, generally stated, to provide a direct-current reclosing system which shall be of simple construction, economical to manufacture and install, and which shall function with a higher degree of accuracy in the measurement of load resistance than systems heretofore used.

A more specific object of my invention is to provide for increasing the accuracy of direct-current reclosing systems by increasing the sensitivity thereof to changes in load resistance under short-circuit or other fault conditions.

Another object of my invention is to provide for increasing the accuracy of direct-current reclosing systems by utilizing control elements therein which inherently function to amplify or magnify current changes resulting from changes in load resistance under fault conditions.

A further object of my invention is to provide for utilizing a differential relay in direct-current reclosing systems for measuring the load resistance and controlling the closing operation of the line switch or contactor, and increasing the sensitivity of the relay by connecting rectifiers of the contact type in series with one or more of its operating windings.

Figure 2:
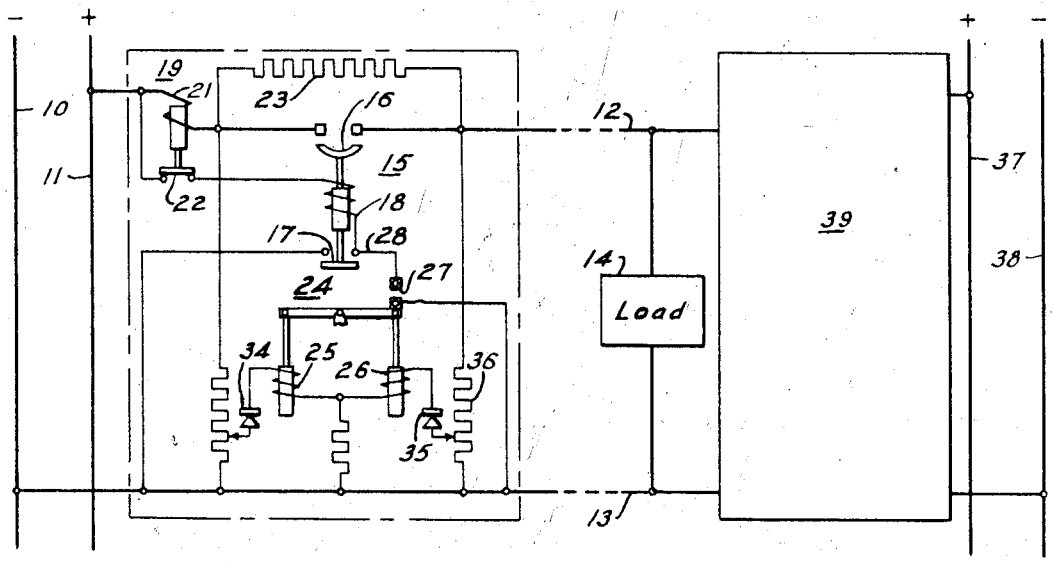

These and other objects of my invention will become more apparent from the following detailed description when read in conjunction with the drawing wherein:

Figure 1 is a diagrammatic view of a direct-current reclosing system for stub-end feeders embodying the principal features of my invention, and Fig. 2 is a similar view of a modification of the system of Fig. 1 applied to a tie-line feeder.

In practicing my invention in a preferred embodiment thereof, the circuit interrupter or contactor, which connects the stub-end feeder to the main bus or connects two busses together through a tie-line feeder, is tripped or opened by a fault responsive relay and reclosed in response to a predetermined increase in load resistance by means of a differential relay controlled in accordance with the difference in voltages proportional to the main bus voltage and the electrical condition of the feeder. The contactor is bridged by a load-measuring resistor to which one of the operating windings of the differential relay is connected either directly or indirectly through a potentiometer, the other winding of the relay being connected to a second potentiometer connected to the main bus side of the feeder. In series with one or both of the windings of the relay is connected a rectifier device of the contact type, preferably of the copper-oxide type, which functions to magnify current changes in the relay windings in response to predetermined voltage changes and thereby increase the sensitivity of the relay and the accuracy of measurement of the load resistance.

Referring now to the drawing, there is shown in Fig. 1 an embodiment of my invention as it may be applied to stub-end feeders which supply power to a load from a single main bus or source of power supply. The direct-current power source or supply bus is represented by conductors 10 and 11, the load circuit or feeder by conductor 12, and a common return conductor is designated by the numeral 13. The load 14 is connected between the feeder 12 and the return conductor 13 as shown.

The feeder 12 is connected to the positive conductor 11 of the source by means of a circuit interrupter or contactor 15 provided with main contact members 16, auxiliary contact member 17 and an operating winding 18.

A fault responsive device in the form of an overload relay 19 is provided for the purpose of opening the interrupter in response to a fault on the feeder circuit. The overload relay is provided with an operating winding 21 connected in the feeder circuit and auxiliary contact members 22 connected in the operating circuit of the interrupter.

Under normal operating conditions the interrupter 15 is held in its closed position by means of the circuit extending from supply conductor 11 through contact members 22, operating winding 18 and auxiliary contact member 17 to the return conductor 13.

A load-measuring resistor 23 is connected across the terminals of the interrupter in such manner that it is automatically inserted into the feeder circuit when the interrupter is opened by the overload relay 19. This resistor functions in a well known manner to limit the fault current in the feeder or load circuit and in this instance, it is also used as a source of control voltage for effecting a reclosure of the interrupter 15.

In order to provide for effecting a reclosing operation of the interrupter 15 in response to a predetermined increase in the electrical condition or load resistance of the feeder circuit, a relay 24 jointly responsive to the voltage of the supply source and a voltage determined by the electrical condition is utilized. In this instance, this relay is shown in the form of a differential relay having opposed operating windings 25 and 26 and contact members 27. The contact members 27 are connected by means of a conductor 28 to the operating winding 18 of the interrupter. It will be apparent that when the relay 24 operates to close its contact members 27 an operating circuit is provided to effect a closing operation of the interrupter.

One terminal of each of the operating windings 25 and 26 is connected to the return conductor 13 through a common resistor 29. The opposite terminal of the winding 25 is connected to the adjustable terminal 31 of a potentiometer 32. This potentiometer is connected to be energized in accordance with the voltage of the power supply. The opposite terminal of the other operating winding 26 is connected to an adjustable terminal 33 on the load limiting resistor 23.

It will be apparent that by means of this connection the relative degrees of energization of the operating windings 25 and 26 may be so adjusted that, under conditions where a fault exists on a feeder circuit, the contact members 27 of the relay may be held in an open position. As the fault is cleared or the resistance of the load circuit increases, the voltage drop across the resistor 23 decreases and the force exerted by the operating winding 26 overcomes that produced by the winding 25 and the contact members 27 are closed and held closed to complete the operating and holding circuit for the interrupter.

These connections provide a modified Wheatstone bridge arrangement in which the resistor 23 and the portion (a) of the potentiometer 32 form two adjacent legs and the resistance of the load and the portion (b) of the potentiometer 32 form the other two adjacent legs connected between the supply conductors 10 and 11. The operating windings 25 and 26 of the relay are connected across the bridge and also to one side of the supply source through the resistor 29. This method of connection increases the sensitivity and accuracy of the bridge as relay winding 25 is responsive to the potentiometer voltage and the winding 26 is directly responsive to the voltage drop across the load.

In order to provide for increasing the sensitivity of the differential relay 24 and thereby increase the accuracy of load measurement, a device in the nature of a rectifier of the contact type is preferably connected in series with each of the operating windings 25 and 26. These devices inherently function to magnify or increase the current flow in the relay coils in response to predetermined changes in voltage. This results from the fact that devices of this character have been found to have the inherent characteristic of varying their resistance greatly in accordance with current density which provides for obtaining a much greater change in current for a predetermined change in voltage than would otherwise be possible.

While it is preferable to utilize both rectifier devices 34 and 35 in order to maintain the relay 24 in a balanced condition regardless of any variation in the supply voltage, if the supply voltage is constant the rectifier device 34 may be eliminated.

In Fig. 2 there is shown another embodiment of the invention as it may be applied to a tie-line feeder.

In this instance the reclosing device is generally the same as that described in Fig. 1 except that a second potentiometer 36 is provided. The other parts are exactly the same and have been designated by means of the same reference numerals.

The operating winding 26, instead of being connected to the load-measuring resistor 23, is connected through its associated rectifier device 35 to potentiometer 36. This potentiometer is connected directly across the feeder circuit and the voltage to be derived therefrom is directly proportional to the electrical condition of this circuit.

Since this is a tie-line feeder application, a second pair of direct-current busses is illustrated by the conductors 37 and 38 and a second reclosing device is indicated by the rectangle 39. The details of this second reclosing device are the same as described hereinbefore. It will be understood that in this instance the load 14 is located between the two pairs of direct-current busses as shown and that power may be supplied from either or both pairs of busses.

The rectifier devices 34 and 35 also function in this instance to increase the sensitivity of the differential relay 24 in the same manner as described in connection with Fig. 1.

In view of the foregoing description it will be apparent that I have provided for greatly increasing the sensitivity of a load-measuring reclosing device which is made up of standard relays and parts. By utilizing the rectifier devices 34 and 35 in the operating circuits of the differential relay, it is possible to considerably increase the ohmic value of the load-measuring resistor 23 in order to reduce the fault current to a minimum and still obtain the same accuracy of measurement as is obtainable with systems now in use or to obtain greater accuracy with load-measuring resistors of the same ohmic value as those now used in other systems. Where extreme accuracy is not essential the reduction in ohmic value of the load-measuring resistor is of advantage as it not only reduces the cost of the resistor but reduces power loss under fault conditions.

While I have disclosed specific and practical embodiments of my invention, it will be apparent that various changes and modifications may be made therein without departing from the principles of the invention as defined by the appended claims.

I claim as my invention:

1. The combination with a direct current load circuit and a direct current supply circuit and a circuit breaker having fault responsive tripping means and a closing means for connecting the load and supply circuits together, of a load measuring resistor connected in bridging relation with the main contact members of the circuit breaker, a differential relay having opposed operating windings for controlling the operation of the closing means of the breaker, circuit means for connecting the operating windings of the differential relay to be energized by voltages derived from the supply circuit and the load measuring resistor, respectively, for effecting a reclosure of the circuit breaker in accordance with the resistance of the load circuit, a copper-oxide rectifier connected in series circuit relation with each of the relay operating windings, and a common resistor connected in series circuit relation with both windings, said copper-oxide rectifiers functioning to amplify current changes in the relay windings in response to voltage changes in their respective circuits, and said common resistor functioning to vary the circuit flow in one relay winding in response to and in the opposite sense to a variation of current flow in the other relay winding, whereby the sensitivity of the differential relay to voltage changes is increased to provide increased accuracy of load measurement in effecting a reclosing operation.

2. An automatic reclosing circuit breaker device for connecting two direct current circuit sections having a common return conductor comprising, main contact members disposed to be connected between said circuit sections, means for closing said main contact members, a load resistor connected in bridging relation with the main contact members, fault responsive means for opening the main contact members, a differential relay having opposed operating windings for controlling the energization of the closing means to effect a reclosure of the main contact members, circuit means including a rectifier device of the contact type connecting one terminal of one of said operating windings to the load resistor, a potentiometer having one terminal connected to the supply side of the main contact members and its other terminal being disposed for connection to the common return conductor, means including a rectifier device of the contact type connecting one terminal of the other operating winding of the differential relay to said potentiometer, and circuit means including a resistor common to both of said operating windings for connecting their other terminals to the common return conductor, said rectifier devices functioning as current amplifiers as the result of their inherent characteristics of decreasing their effective resistance to current flow in accordance with current density, and said common resistor functioning to vary the current flow in one operating winding in response to and in the opposite sense to a variation in the current flow in the other operating winding, whereby sensitivity of the differential relay to voltage changes is increased and the accuracy of load measurement increased.

3. An automatic reclosing circuit breaker device for controlling the connection between two direct current circuit sections having a common return conductor comprising, a circuit breaker having an operating means, a load resistor connected in bridging relation to the main contact elements of the breaker so as to be connected between the circuit sections on opening of the breaker, a first potentiometer connected between the load resistor and common return conductor, a second potentiometer connected between the circuit section functioning as a supply conductor and the common return conductor, a differential relay for controlling the energization of the operating means of the breaker, said relay having opposed operating windings connected to be responsive to the voltages derived from said potentiometers, a rectifier device of the contact type connected in series circuit relation with each of said operating windings, and resistance means common to both of said operating windings and connected in series circuit relation therewith, said rectifier devices functioning to amplify the flow of current in said operating windings in response to voltage changes thereon, and said common resistance means functioning to automatically vary the current flow in one of said operating windings inversely and in response to a variation in the current flow in the other winding, whereby the sensitivity of the relay to voltage changes is increased and the accuracy of operation of the reclosing device in response to changes in load resistance under fault conditions is increased.

MAURICE E. REAGAN.